E. GRILL.
TIRE.
APPLICATION FILED OCT. 9, 1920.

1,393,773.

Patented Oct. 18, 1921.

Inventor
Enoch Grill
By Frank E. Liverance, Jr.
Attorney

UNITED STATES PATENT OFFICE.

ENOCH GRILL, OF GRAND RAPIDS, MICHIGAN.

TIRE.

1,393,773.  Specification of Letters Patent.  Patented Oct. 18, 1921.

Application filed October 9, 1920. Serial No. 415,851.

*To all whom it may concern:*

Be it known that I, ENOCH GRILL, a citizen of the United States of America, residing at Grand Rapids, in the county of Kent and State of Michigan, have invented certain new and useful Improvements in Tires; and I do hereby declare the following to be a full, clear, and exact description of the invention, such as will enable others skilled in the art to which it appertains to make and use the same.

Figure 1:
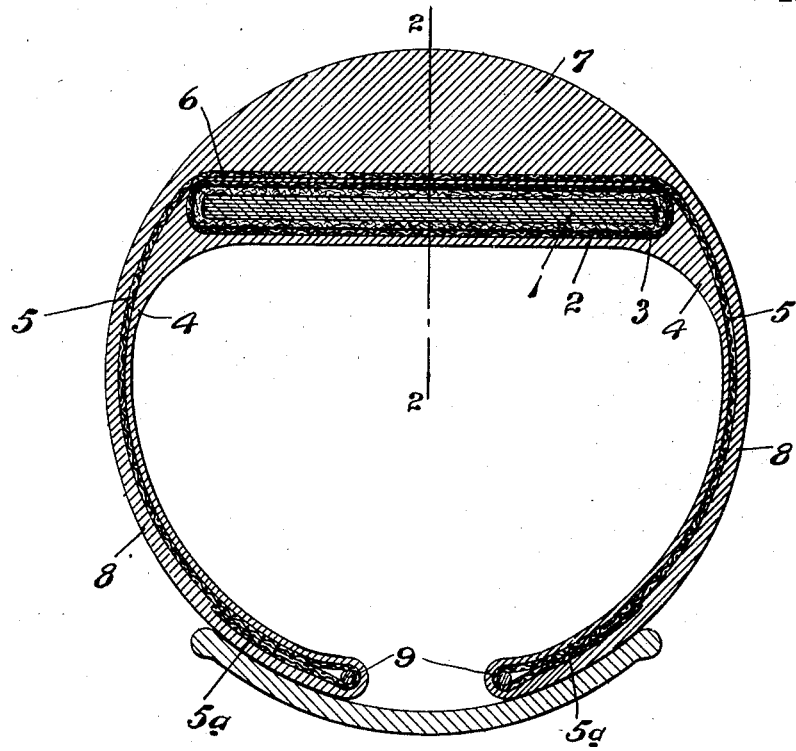
Figure 2:
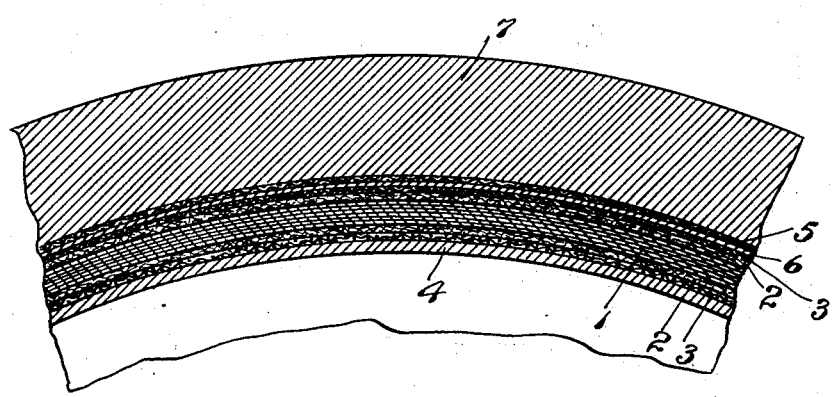

This invention relates to a pneumatic tire casing. It is an object and purpose of the present invention to construct a tire casing in which an air receiving tube may be placed, forming the casing in such manner that possibility of puncture is minimized, and also that rupture of the fabric of the tire at the sides is lessened and rendered practically negligible, even though the casing is operated at much less than the usual required pressure for tire casings of this character. A further object of the invention is to construct a tire casing with a continuous ring of reinforcing material around it and embedded in the tread thereof so as to be out of sight and acting to spread the weight or shocks sustained over a much greater area in the tire casing with a resultant lessening of the necessity for having the tire inflated to a high degree of pressure, and making it possible to construct the tire with much less thickness of fabric at the sides, thereby permitting greater flexibility of the tire at its sides without injury to the fabric. Many other objects and purposes than those stated specifically at this point will appear fully and in detail as understanding of the invention is had from the following description, taken in connection with the accompanying drawing, in which, Figure 1 is a transverse section taken through the tire casing of my invention, and Fig. 2 is a fragmentary longitudinal section taken substantially on the plane of line 2—2, of Fig. 1.

Like reference characters refer to like parts in the two figures of the drawing.

In the construction of the tire casing a band 1 made of a plurality of layers or laminations of thin sheet metal is used, the band thus provided being formed by winding a band of sheet metal of the required width upon itself until the necessary number of layers of metal are secured. This metal band is somewhat narrower than the diameter of the casing and is inclosed in a leather covering 2 which completely incases it. Around the leather covering a fabric cover 3 is placed which completely incases the leather covering. Rubber 4 covers the construction and is suitably vulcanized thereto serving to cement the middle portion of a heavy fabric strip 5 to the outer ends of the fabric covering 3. This fabric strip 5 is continued outwardly and downwardly to make the sides of the tire casing and the rubber 4 lines the inner sides thereof as shown, being in practice a thin coating only except at the ends of the metal member where it is thickened and curved to make a smooth inner surface to the tire casing. Rubber in small amount is also placed directly between the fabric 5 and the outer side of the fabric covering 3, as indicated at 6 and is suitably vulcanized to make a secure connection between them.

A thick and heavy tread 7 of rubber is vulcanized on to the flat outer portion of the fabric 5, the rubber being continued along the outside of the fabric 5 until it meets the inner lining 4 of rubber around the beads of the casing. The edges of the fabric 5 are turned back on themselves and around strong inelastic wires 9 and cemented and vulcanized together as shown in Fig. 1.

This construction of tire casing with one relatively heavy and strong thickness of fabric at the sides permits the inflation of the tire to a much less degree than where several thicknesses of thin tire fabric are used as the kneading of the fabric in this invention does not result in any separation of different layers of fabric and weakening thereof with consequent disruption from high internal pressure. Furthermore, the band 1 of laminated metal furnishes a means for transmitting weight and shocks to a considerable distance to each side of the point of application of the weight or shock with a less flattening of the tire than if said band was absent. The laminated band 1 also resists distortion out of a circular form and helps to maintain the tire casing in true circular form and keeps the tire from flattening materially even though the pressure within is lessened and is far below normal pressure. The thick heavy tread adds to the life of the tire and it, together with the metal band 1 interposes a prohibitive barrier against the passage of nails, or other instruments which would puncture the inner tube if permitted to pass thereto, and the only points where puncture is liable to occur is at the sides, this being not likely to happen as puncturing devices are usually picked up in the tread.

Some variation in detail of structure is possible without departing from the invention defined in the appended claims and I consider myself entitled to all forms of structure which come within the scope of such claims.

I claim:

1. A tire casing comprising a continuous band of metal made up of laminations of sheet metal, a leather covering incasing the same, a fabric covering around the leather, a heavy fabric strip cemented to the outer side of the fabric covering and having its sides extended outwardly and downwardly to make sides to the casing, and a rubber tread vulcanized around the last mentioned fabric and continued over the sides thereof, said last mentioned fabric being also covered with rubber on its inner side, substantially as described.

2. A tire casing comprising a continuous metal band made from a continuous strip of sheet metal wound upon itself to make a plurality of layers or laminations, a covering completely incasing the band, a heavy fabric strip cemented to the outer side of the covering and extended outwardly and downwardly at each side to make the sides of the casing, two continuous inelastic wires about which the outer portions of said fabric are turned, thereby forming beads, and rubber cemented to the fabric on its outer and inner sides, said rubber over the band being thickened to make a heavy tread, substantially as described.

In testimony whereof I affix my signature.

ENOCH GRILL.